Jan. 22, 1963 J. J. RYAN 3,074,761
SAFETY SEAT BELT
Filed July 10, 1961 2 Sheets-Sheet 1
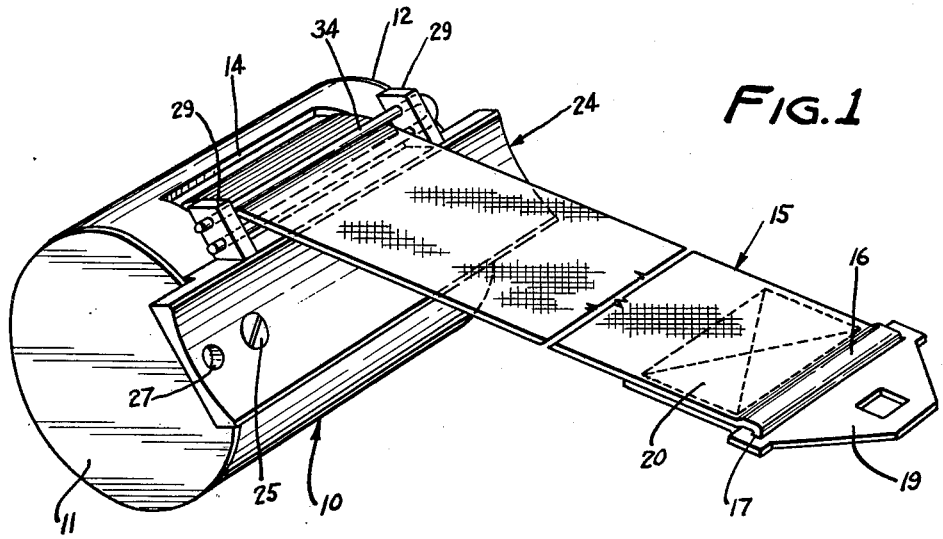
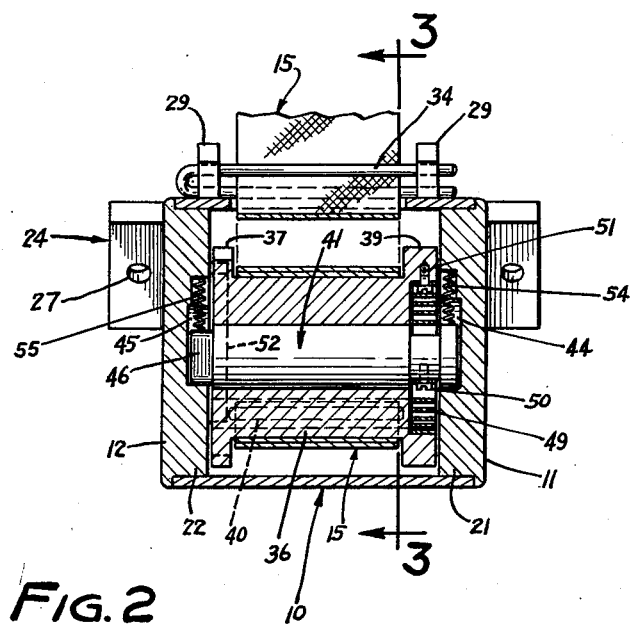
INVENTOR.
JAMES J. RYAN
BY
*Moore White & Reid*
ATTORNEYS

United States Patent Office 3,074,761
Patented Jan. 22, 1963

3,074,761
SAFETY SEAT BELT
James J. Ryan, St. Paul, Minn., assignor to The Regents of the University of Minnesota, Minneapolis, Minn., a corporation of Minnesota
Filed July 10, 1961, Ser. No. 123,020
8 Claims. (Cl. 297—388)

This invention relates to safety seat belts for use in automotive vehicles and aircraft and the like. More particularly this invention relates to an automatically locking safety seat belt adapted to restrain a passenger resiliently and without discomfort under normal travel conditions and to restrain the passenger securely under impact of collision, sudden stop or the like. At the same time, the seat belt of the present invention is adapted to retract into a housing when not in use.

The value of seat belts in the prevention of injuries upon crash or sudden stopping of automotive vehicles and aircraft has been definitely established. The ability of seat belts to absorb greater and greater forces has been increased through the development of better seating and methods of attachment of the belts. However, in spite of improvements in seat belts themselves and their proven effectiveness, there has been relatively little interest on the part of the general public in the widespread installation and use of automotive seat belts. This has been due to a number of factors, among which may be mentioned the difficulty and cost of initial attachment of the belts, the complexity of the buckling means, the discomfort due to the restraint applied to the individual passenger, the usually disorderly and unkempt appearance of the belts when not in use, and the like. The present invention is directed toward meeting most of these objections.

The automatic seat belts according to the present invention are attached to the seat by a mechanism which continually keeps the belts retracted to the rear of the seat in the proper position for immediate use. When the ends of the seat belt on each side of the passenger are clasped and pulled forward slowly the belt may be easily fastened in front. Any slack in the belt is immediately taken up, but the restraint applied to the passenger is gentle. If the passenger rotates his body in order to look backward or reach into the back seat, or if he stretches forward to touch the dash or reach into the glove compartment, the seat belt freely follows the body motions. The passenger is not restrained in forward, lateral, or rotary motion. The belt may be freely pulled forward to create slack in order to enable the belt to be easily unbuckled. When the buckle is released, the two ends of the seat belt automatically retract to the back of the seat. However, if a sudden force is applied by the body on the seat belt as the result of sudden application of the brakes, or a collision with another automobile or some stationary object, the belt is immediately and tightly locked and the passenger is securely retrained.

The invention is illustrated in the drawings in which the same numerals refer to corresponding parts and in which:

FIGURE 1 is a perspective view of one safety seat belt unit;

FIGURE 2 is a longitudinal section on the line 2—2 of FIGURE 3 and in the direction of the arrows;

Figure 3:
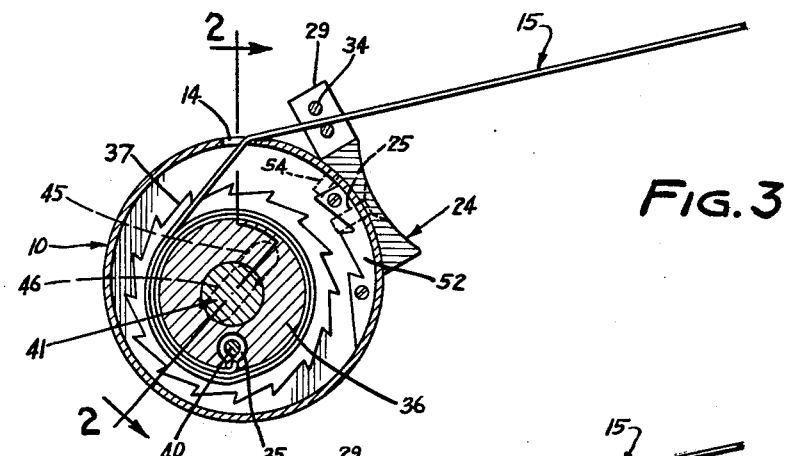
FIGURE 3 is a transverse section on the line 3—3 of FIGURE 2 and in the direction of the arrows showing the safety seat belt device in normal unlocked operating position.
Figure 4:
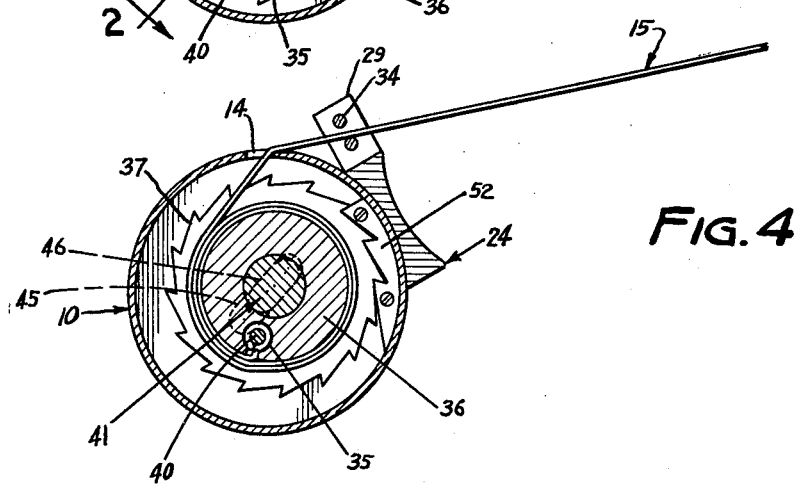
FIGURE 4 is a section similar to FIGURE 3 but showing the unit in locked position.
Figure 5:
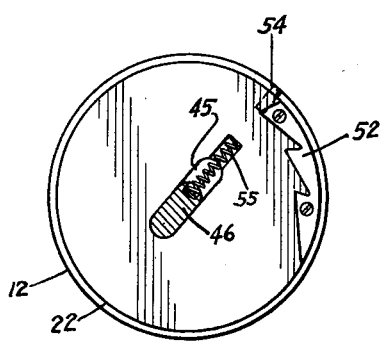
FIGURE 5 is a detailed elevation of one end cap of the safety seat belt housing showing a shaft key in section.

Referring to the drawings, each safety seat belt unit comprises a cylindrical housing, indicated generally at 10, and closed at opposite ends by means of end caps 11 and 12. A slot 14 is provided in the upper surface of the housing 10, extending longitudinally and located intermediate of the ends of the housing. A belt, indicated generally at 15, of textile webbing or similar material, is adapted to be housed within housing 10 and extends through slot 14. It will be understood that for normal use two safety belt units are required for each passenger, each unit dispensing approximately one-half of the required belt length and the ends of the belt housed in each being provided with complementary fastening or buckling means. Exemplary buckle means are described in U.S. Patents Nos. 2,876,518 and 2,846,745. As shown, one end of belt 15 is folded over in a loop 16 which extends through a slot 17 of a fastening number 19 and is doubled back upon the undersurface of the belt and stitched at 20.

As best shown in FIGURE 2, the end cap 11 includes an inner end plate 21 of lesser diameter which fits with a slide fit in one end of housing 10. End cap 12 is similarly provided with an inner end plate 22. Housing 10 is attached to a mounting plate 24 by means of bolts 25 which extend through the mounting plate and through the wall of housing 10 and into the edges of inner end plates 21 and 22, respectively. The mounting plate is contoured on one side to fit against the housing and on the other side to fit against the lower rear edge of the frame of the passenger seat with which the belt is to be used. Holes 27 permit attachment to the seat frame by means of self tapping screws or bolts, or like fastening means.

One edge of mounting plate 24 is provided with a pair of upstanding lugs or ears 29 each provided with a pair of holes, the holes in one lug or ear being aligned about a common longitudinal axis with the corresponding holes in the other. A guide member and stop member 34 in the form of a pair of pins or bent rod extending through these holes is supported by the lugs or ears 29. The belt extends between the parallel bars of member 34 which functions as a stop for the belt to prevent complete retraction of the belt into the housing and to insure ready accessibility of the belt ends by the passenger. The opposite end of belt 15 is folded back on itself and stitched to form a small loop 35 for the purpose of attaching the belt to a drum 36 within the housing, as described in greater detail hereinafter.

One end of drum 36 is provided with a saw toothed flange or rim 37 adapted to lock the drum against rotation under influence of sudden deceleration of the passenger vehicle, as described hereinafter. The flange or rim at the opposite end of drum 36 is in the form of a spring housing 39. The toothed rim 37 and the spring housing 39 at opposite ends of drum 36 are rigidly secured for movement with the drum. The periphery of drum 36 is provided with a longitudinal slot through which the doubled over end of the belt extends. The belt is held in place by means of a pin 40 extending through the loop 35 in the end of the belt. The diameter of pin 40 is such that the thickness of the pin plus the belt loop is larger than the width of the slot in the periphery of the drum.

Drum 36 is adapted to rotate relative to a central longitudinal shaft 41. One end of shaft 41 is adapted to be received in an angularly disposed slot 44 in inner end plate 21 of cap 11. The opposite end of shaft 41 is adapted to be received in a corresponding but somewhat narrower parallel angularly disposed slot 45 in the inner end plate 22 of the opposite end cap 12. The shaft 41 is held fixed against rotation, while at the same time being free to move in the slots 44 and 45, by means of a rectangular lug or key 46 extending from one end of the shaft and adapted to be received in the narrower slot 45 in the end cap 12. The slot 45 is parallel to and narrower than slot 44. The shaft 41 is free to move the length of the slots while being held fixed against rotation.

One end of a spiral spring 49 is attached at 50 to the shaft 41 and the other end is attached to the inside of the spring housing 39 by means of a bolt or rivet 51, or equivalent fastening means, extending through the rim. A saw toothed ratchet 42 is disposed in arcuate form around part of the upper edge of the inner face of inner end plate 22 of the end cap 12. The teeth of ratchet 52 are adapted to engage the teeth of toothed rim 37 when the shaft 41 is toward the forward upper end of slots 44 and 45. The diameter of the toothed rim 37, however, is such that when the shaft is at the other end of the slots the teeth of the rim are disengaged from the teeth of the ratchet. Slots 44 and 45 are so disposed as to be inclined forwardly in the direction of travel of the vehicle and upwardly at an angle from the horizontal between about 35° and 50° and preferably about 45°. To insure proper orientation and alignment of the slots the edges of the inner end plates 21 and 22 are provided with dowel pins or bolts 54 or the like, respectively, which engage notches in the edges of the housing shell. These pins also serve to align the fastening means 25 for attaching the mounting plate and holding the end caps in place.

The seat belt locking mechanism according to the present invention works on the principle that, if a force is placed on the rim of a free wheel in a direction tangential to the rim, this force will cause both rotation of the wheel about its axis and translation of the wheel in the direction of the applied force. In the locking mechanism the seat belt is wrapped around a drum which rotates on a shaft. The shaft is restricted from rotation but can move back and forth in the angularly disposed slots at the ends of the unit housing.

If a force is applied to the seat belt in a direction generally parallel to the slots 44 and 45 in the ends of the housing, the drum 36 will rotate on shaft 41 and will also move in the direction of the applied force. As the drum moves forward in the slot the rotating teeth around the rim 37 of the drum engage the stationary rachet teeth 52 and lock the drum, thus preventing further rotation. This occurs when the vehicle is suddenly decelerated, as in a crash or collison or fast braking. The inertia of the drum plus the forward force applied by the passenger to the belt tends to move the drum forward into the locked position.

When the force on the belt becomes zero the clock spring 59 retracts the belt onto the drum. As the belt is pulled out, the drum rotates and tightens the spring producing a torque which exerts a constant and gentle pressure on the passenger when the belt is in use and re-rolls the belt on the drum when it is no longer in use.

To prevent the drum from locking when a small force is put on the belt, small coil springs 54 and 55 between the shaft ends and the housing may optionally be used to force the shaft to the position with its ends at the bottom of the slots 44 and 45 and out of the locked position. When such springs are employed a force larger than the spring force must be applied before the drum will lock. The magnitude of the locking force can be varied by adjusting the tension in these springs. In most instances, the springs need not be utilized but the weight of the drum and shaft assembly is such that gravity alone is sufficient to cause the shaft to move downward in the slotted end plates and thereby disengage the teeth.

The rotary teeth of rim 37 and the stationary locking teeth of ratchet 52 are so designed that they place a force on the rotating teeth which tends to move them into the fully locked position immediately as soon as they come into contact. The locking action is positive. There can be no slipping of the belt once the drum is in the locked position. The maximum length of belt which will unwind from the drum during the time between application of the locking force and full locking is only about ¾ of an inch.

The return action of the drum under influence of the spring takes up any slack in the belt which may be present, even during an accident when the belt may become randomly tight or slack as the body rolls and bounces. This same action holds the belt comfortably in place in spite of movement by the passenger in his seat as he changes position, leans forward or the like. When the buckle is disengaged the spring tension retracts the belt so that the buckle members are drawn back to the crease or crevice between the seat and its back to present a neat and orderly appearance while, at the same time, remaining readily available for reuse. For maximum safety several auxiliary safety factors are desirably also utilized. The seat itself should be firmly anchored so that it is subject only to limited movement but will not tear loose the vehicle floor. The dashboard and steering wheel are both desirably padded. The vehicle is also desirably fitted with hydraulic shock absorbing bumpers.

Although it is desirable in most instances to utilize a safety seat belt according to the present invention in pairs for each passenger, it is feasible to use but a single automatic locking safety belt unit. In this instance, the fastening member 19 is coupled to a cooperating buckle element or other fastening means which is either rigidly secured to the seat frame adjacent one side of the passenger, or is flexibly secured, as to a length of webbing which in turn is secured to the seat frame or vehicle floor. The same gentle restraint is provided along with the same immediate and positive locking action in the event of rapid deceleration of the vehicle.

Drum 36 may optionally be provided with toothed rims 37 at both ends of the drum. In this instance a second saw-toothed ratchet 52 is provided within the housing adjacent the opposite end plate and spaced from the edge of the second toothed rim when shaft 41 is in the bottom end of slots 44 and 45.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A safety seat belt device for restraining the movement of a body carried within a vehicle when the velocity of the vehicle is rapidly changed, said device comprising a housing, a shaft within said housing, said shaft being fixed against rotary movement but adapted for limited movement in a plane, a drum carried on said shaft and adapted for rotation thereon, a circular toothed member adapted for rotation with said drum, an arcuate toothed member fixed to the housing and adapted for engagement with said circular toothed member when said shaft is in one position in its plane of movement, said drum and circular toothed member being adapted for free rotation when said shaft is in another position in its plane of movement, a belt, said belt being adapted to extend partially around a body, one end of said belt being attached to said drum and the other end carrying fastening means adapted to be secured to a complementary fastening means to restrain said body, spring means associated with said shaft and drum to retract said belt into said housing around said drum, said shaft and drum and rotary toothed member being movable together from the position of free rotation of said drum and circular toothed member to the position of engagement with said fixed arcuate toothed member due to inertia of the movable elements upon rapid change in velocity of the vehicle.

2. A safety seat belt device according to claim 1 further characterized in that said shaft is supported within said housing at opposite ends in parallel slots, at least one end of said shaft is so shaped relative to the slot at that end as to be fixed against rotation while still adapted for limited longitudinal movement between the ends of that slot, said slots being disposed to extend angularly upwardly and forwardly in the direction of travel of the vehicle, said drum and circular toothed member being freely rotatable on said shaft when said shaft rests in the lower ends of said slots and said circular toothed member engaging said fixed arcuate toothed member when the ends of said shaft move upwardly and forwardly in said slots.

3. A safety seat belt device according to claim 2 further characterized in that said slots are disposed at an angle between about 35° and 50° from horizontal.

4. A safety seat belt device according to claim 3 further characterized in that said slots are disposed about 45° from horizontal.

5. A safety seat belt device according to claim 1 further characterized in that the diameter of said housing is greater than the diameter of said circular toothed member at the outermost point of the teeth thereof by at least the maximum width of said fixed arcuate toothed member whereby said circular toothed member may rotate freely when in one position without engagement with the teeth of said fixed arcuate toothed member.

6. A safety seat belt device according to claim 1 further characterized in that the teeth of said circular toothed member extend in the direction of rotation of the drum and circular toothed member as the belt is being unwound from said drum and the teeth of said fixed arcuate tooth member extend in the opposite direction for quick positive engagement with the teeth of the circular member.

7. A safety seat belt device according to claim 1 further characterized in that one end of said drum is provided with a recessed spring housing, said spring means is a spiral spring, one end of said spiral spring is secured to the inside of said spring housing, the other end of said spring is secured to said shaft, said spring is spiraled in a direction such that rotation of the drum as the belt is being unrolled from said drum tightens the spring to produce a torque exerting constant spring tension on said belt.

8. A safety seat belt device for restraining the movement of a body carried within a vehicle when the velocity of the vehicle is rapidly changed, said device comprising of housing, a shaft within said housing, said shaft being supported within said housing at opposite end in parallel slots, at least one end of said shaft being so shaped relative to the slot at that end as to be fixed against rotation while still adapted for limited longitudinal movement between the ends of that slot, said slots being disposed to extend angularly upwardly and forwardly in the direction of travel of the vehicle between about 35° and 50° from horizontal, a drum carried on said shaft and adapted for rotation thereon, a circular toothed member adapted for rotation with said drum, an arcuate toothed member fixed to the housing and adapted for engagement of said circular toothed member when the ends of said shaft move upwardly and forwardly in said slots, said drum and circular toothed member being adapted for free rotation when the ends of said shaft rest in the lower end of said slots, a belt, said belt being adapted to extend partially around a body, one end of said belt being attached to said drum and the other end carrying fastening means adapted to be secured to a complementary fastening means to restrain said body, a recessed spring housing at one end of said drum, spring means associated with said shaft and drum to retract said belt into said housing around said drum, said spring means being a spiral spring, one end of said spiral spring being secured to the inside of said spring housing, the other end of said spring being secured to said shaft, said spring being spiraled in a direction such that rotation of the drum as the belt is being unrolled from said drum tightens the spring to produce a torque exerting constant spring tension on said belt, said shaft and drum, rotary toothed member, spring housing and spring being movable together in a plane of movement parallel to said slots from the position of free rotation of said drum and circular toothed member to the position of engagement with said fixed arcuate toothed member due to inertia of the movable elements upon rapid change in velocity of the vehicle, the teeth of said circular toothed member extending in the direction of rotation of the drum and circular toothed member as the belt is being unrolled from said drum and the teeth of said fixed arcuate toothed member extending in the opposite direction for quick positive engagement with the teeth of the circular member.

References Cited in the file of this patent

UNITED STATES PATENTS

| 2,557,313 | Quilter | June 19, 1951 |
| 2,708,555 | Heinemann | May 17, 1955 |
| 2,953,315 | Lautier | Sept. 20, 1960 |